(12) United States Patent
Schnieders

(10) Patent No.: US 10,785,260 B2
(45) Date of Patent: Sep. 22, 2020

(54) OPTICALLY ANALYZING DOMAIN NAMES

(71) Applicant: Morgan Stanley Services Group Inc., New York, NY (US)

(72) Inventor: William R. Schnieders, New York, NY (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 259 days.

(21) Appl. No.: 16/059,707

(22) Filed: Aug. 9, 2018

(65) Prior Publication Data

US 2020/0053119 A1    Feb. 13, 2020

(51) Int. Cl.
*H04L 29/06* (2006.01)
*G06K 9/68* (2006.01)
*G06K 9/62* (2006.01)
*H04L 29/12* (2006.01)

(52) U.S. Cl.
CPC ........ *H04L 63/1483* (2013.01); *G06K 9/6215* (2013.01); *G06K 9/6828* (2013.01); *H04L 63/101* (2013.01); *H04L 63/1425* (2013.01); *G06K 2209/01* (2013.01); *H04L 61/1511* (2013.01)

(58) Field of Classification Search
CPC . H04L 63/1483; H04L 63/101; G06K 9/6215; G06K 9/6828
See application file for complete search history.

(56) References Cited

U.S. PATENT DOCUMENTS

| | | | |
|---|---|---|---|
| 7,624,277 B1 * | 11/2009 | Simard | G06F 21/31 704/270 |
| 8,208,736 B2 | 6/2012 | Meyer et al. | |
| 8,924,484 B2 * | 12/2014 | Wilson | G06Q 10/107 709/206 |
| 8,949,981 B1 * | 2/2015 | Trollope | H04W 4/21 726/22 |
| 8,989,446 B2 | 3/2015 | Kagarlitsky et al. | |
| 9,014,481 B1 | 4/2015 | Luqman et al. | |
| 9,762,612 B1 | 9/2017 | Schiffman | |
| 9,779,066 B2 | 10/2017 | Shah et al. | |
| 9,875,429 B2 | 1/2018 | Wang et al. | |
| 9,882,933 B1 | 1/2018 | Schiffman | |
| 10,127,388 B1 * | 11/2018 | Popuveniuc | G06F 21/60 |

(Continued)

*Primary Examiner* — Vance M Little
(74) *Attorney, Agent, or Firm* — K&L Gates LLP

(57) ABSTRACT

Systems and methods determine whether domain names are potentially maliciously registered variants of a set of monitored domain names. A computer system can receive domain names from a feed of newly registered domain names. For each received domain name, the computer system can generate a series of images of the domain name in different fonts and/or with various distortions applied thereto. The computer system can then transform the domain name images back to text via optical character recognition. Due to the differences in fonts and/or distortions applied to the generated images of the received domain name, the optical character recognition process can produce different text strings than the originally received domain name. The converted textual domain names are then analyzed to determine whether any one is sufficiently similar to a monitored domain name, indicating that the received domain name could be a malicious variant thereof.

18 Claims, 5 Drawing Sheets

(56) References Cited

U.S. PATENT DOCUMENTS

| | | | |
|---|---|---|---|
| 10,193,923 B2 * | 1/2019 | Wright | H04L 63/1483 |
| 10,679,088 B1 * | 6/2020 | Dalal | G06K 9/6202 |
| 2010/0154055 A1 * | 6/2010 | Hansen | G06F 21/6218 |
| | | | 726/22 |
| 2013/0279759 A1 | 10/2013 | Kagarlitsky et al. | |
| 2015/0128272 A1 * | 5/2015 | Chen | H04L 63/1483 |
| | | | 726/23 |
| 2015/0156210 A1 * | 6/2015 | Hunt | H04L 63/1408 |
| | | | 726/23 |
| 2016/0057167 A1 * | 2/2016 | Bach | H04L 63/101 |
| | | | 726/23 |
| 2016/0140701 A1 * | 5/2016 | Angara | G06K 9/6247 |
| | | | 345/618 |
| 2017/0318049 A1 * | 11/2017 | Maylor | G06F 21/6245 |
| 2017/0339169 A1 * | 11/2017 | Wallace, III | G06F 21/552 |
| 2019/0050559 A1 * | 2/2019 | McCarty | H04L 63/1441 |
| 2020/0067861 A1 * | 2/2020 | Leddy | H04L 51/12 |
| 2020/0228500 A1 | 7/2020 | Olumofin | |

\* cited by examiner

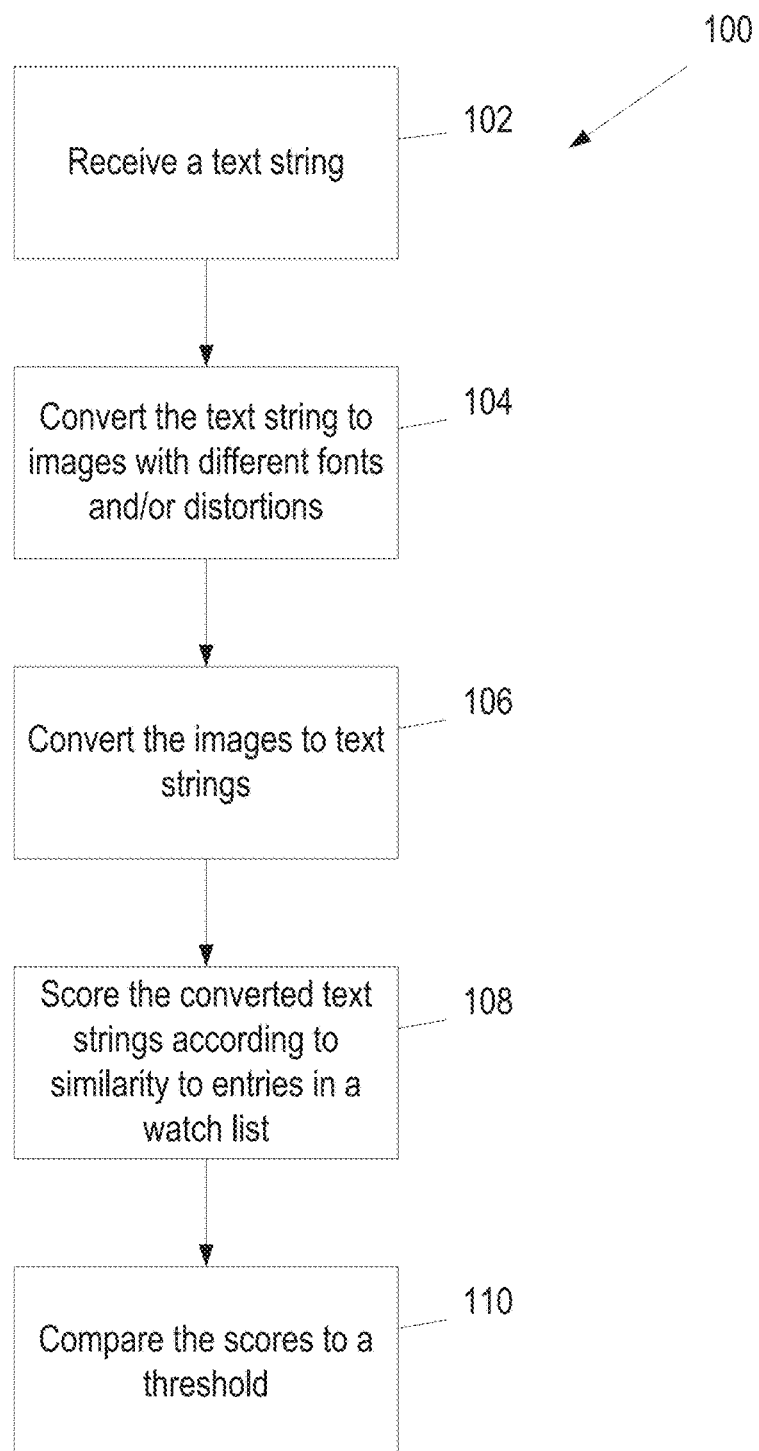

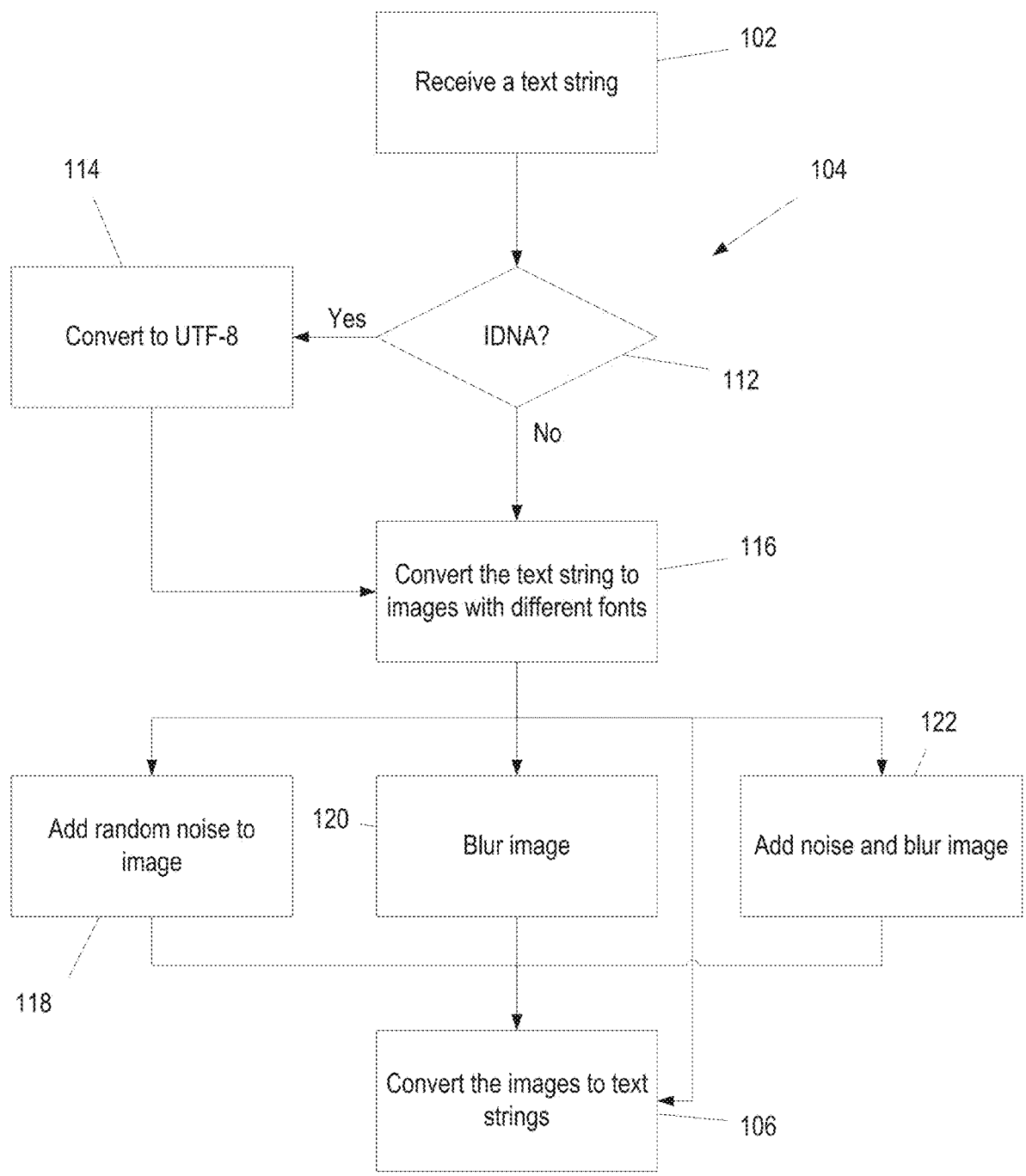

OPTICALLY ANALYZING DOMAIN NAMES

BACKGROUND

Spoofing and phishing attacks in which a malicious actor attempts to trick an individual into entering sensitive information into a website are unfortunately commonplace in using modern information technology resources, such as the Internet, chat, and email. For example, typosquatting is when a malicious actor registers a version of a targeted domain name containing a common typo, a common misspelling, or another close variation of the targeted domain name in the hopes that unwary individuals will accidentally visit the actor's website, instead of the website at the targeted domain name, and input sensitive information for the actor to steal. As another example, a homograph attack is when a malicious actor registers a domain name that appears visually similar to a targeted domain name by exploiting the fact that certain characters or combinations of characters look similar to each other. Some versions of homograph attacks exploit the fact that certain combinations of characters look similar to other characters in certain fonts, such as "rn" appearing similar to "m," "cl" appearing similar to "d," "1" appearing similar to "I," and so on. Other versions of homograph attacks exploit the fact that the internationalized domain names in applications (IDNA) system allows for domain names to be registered with Unicode characters. Unicode includes a much broader array of characters than the American Standard Code for Information Interchange (ASCII) character set that domain names were originally required to use. Unicode include several sets of visually similar characters that can be utilized to registered domain names that are visually similar to a targeted domain name. In one example, a security researcher registered apple.com with the Cyrillic "a" (coded as U+0430 in Unicode) as opposed to the commonplace Latin "a" (coded as U+0061 Unicode). Because the Cyrillic "a" and Latin "a" are essentially indistinguishable, but are nonetheless treated as distinct characters and thus can be used to define distinct domains in the DNS system, individuals could have been tricked into visiting a malicious website. Once present at a malicious website, users can be tricked into entering sensitive information (e.g., by mimicking the appearance of the targeted website and prompting users to enter their login credentials or other information), which can then be used by the malicious actors. Typosquatting, homograph attacks, and other types of spoofing and phishing techniques can even be combined together to attempt to ensnare even wary individuals.

A variety of techniques currently exist for identifying potentially malicious domain names. One approach is to take a protected domain name and precompute all common variations of that domain name that hackers or phishers could possibly register. The owner of the domain name can then preemptively register some or all of variants of the domain name or put them on a registration watch list so that the owner of the domain name is alerted if one of the variants is registered. Another approach is to create an algorithm that receives newly registered domain names, converts any characters having diacritics or glyphs to corresponding diacriticless versions of the characters, and then compares the modified newly registered domain names to a list of protected domain names. Both of these approaches have multiple issues, however. For example, these approaches do not take into account the totality of variables available to a malicious actor when delivering a malicious link. An actor can, for example, adjust the font and typography of an email, include background graphics, or target a population with poor eyesight. As another example, these approaches are limited by the foresight of the individuals programming the algorithms because they need to proactively create a set of rules to address all of the ways that they think that a malicious actor could execute an attack.

SUMMARY

In one general aspect, the present invention is directed to computer-based system and methods that, in various embodiments, detect possible domain name brand infringement by converting potentially infringing domain names from the text domain to the optical domain by creating images, applying multiple distortions to the images, and then converting the optically-distorted domain names back to the text domain through optical character recognition (OCR) for scoring. The scoring method can be based on how closely the OCR output matches the protected domain list, and threat intelligence on how brand infringing domains are created by hackers and phishers. By operating in the optical domain, the systems and methods of the present invention can more closely mimic how a human victim could be ensnared by a hacker or phisher with a malicious link containing a brand-infringing domain name. These and other benefits of the present invention will be apparent from the description that follows.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

FIG. 1A illustrates a logic flow diagram of a process for analyzing a text string, in accordance with at least one aspect of the present disclosure.

FIG. 1B illustrates a logic flow diagram of a process for converting a text string to images with different fonts and/or distortions, in accordance with at least one aspect of the present disclosure.

DESCRIPTION

Certain aspects of the present invention will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting example aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof.

FIG. 1A illustrates a logic flow diagram of a process 100 for analyzing a text string, in accordance with at least one aspect of the present disclosure. In the following description of the process 100, reference should also be made to FIG. 2, which illustrates a diagram of a computer network for executing the process 100. The computer network includes a computer system 200 programmed to determine whether a received text string is a potentially confusingly similar variant of at least one entry in a list of text strings to be monitored (i.e., a watch list or set of keywords). In one aspect, the analyzed text string can be a domain name and the monitored text strings can include a set of domain names or keywords. For conciseness, the process 100 will primarily be described in the following disclosure in terms of analyzing text strings that are domain names; however, this is solely for illustrative purposes and the disclosure should not be interpreted to be so limited.

Figure 2:
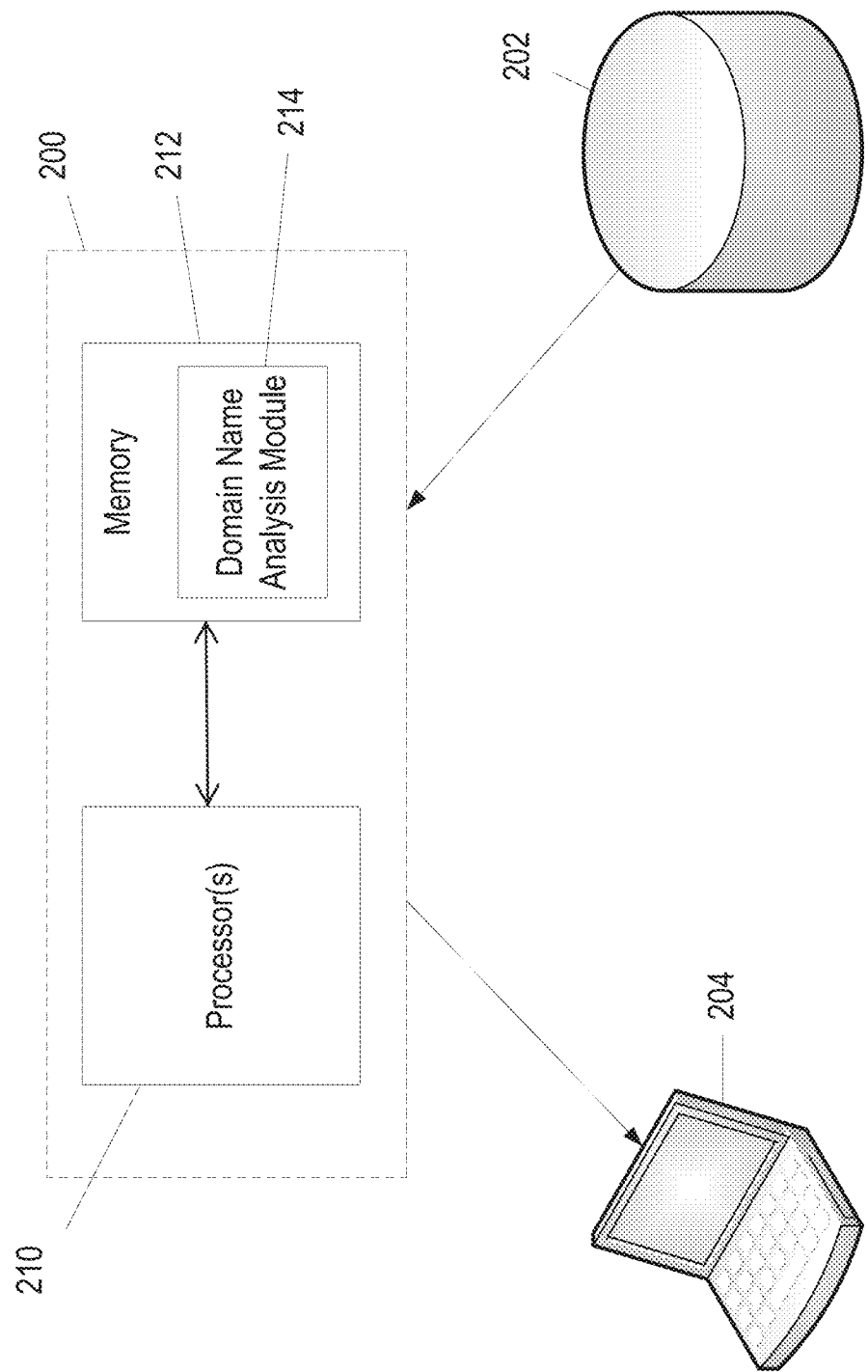
FIG. 2 illustrates a diagram of a computer network for analyzing a text string, in accordance with at least one aspect of the present disclosure.

The computer system 200 includes one or more processors 210 coupled to a memory 212 that stores an optical domain name analysis module 214. For convenience, only one processor 210 is shown in FIG. 2. The memory 212 includes primary memory (e.g., memory directly accessible by the processor(s), such as RAM) and/or secondary memory (e.g., memory that is not directly accessible by the processors(s), such as ROM, flash, HDD, SSD, etc.). The optical domain name analysis module 214 stores computer instructions (e.g., software) that, when executed by the processor(s) 210, cause the processor(s) 210 to execute the process 100. The computer system 200 may be implemented as one or a number of networked computer devices, e.g., servers, laptops, PCs, and so on. The computer system 200 is communicatively connected or subscribed to a data source 202 via, e.g., the Internet or another telecommunication network. The computer system 200 can be programmed (e.g., with the optical domain name analysis module 214) to receive a domain name or set of domain names from the data source 202. In one aspect, the data source 202 includes, for example, a feed of newly registered domain names, such as a feed from a certificate transparency network of SSL certificates published to a certificate transparency log for newly registered domain names (e.g., CertStream). By monitoring a feed of newly registered domain names for potentially confusingly similar variants of the set of monitored domain names, the computer system 200 (by executing the optical domain name analysis module 214) can determine when an entity may be attempting to register a variant of the monitored domain names that might be intended for malicious purposes (e.g., a homograph attack). In various aspects, the monitored domain names can include, for example, the domain names that the operator of the computer system 200 owns or otherwise seeks to monitor, such as commonly attacked domain names (e.g., netflix.com, yahoo.com, gmail.com, or blockchain.com). Once alerted to the existence of the potentially malicious variant, one could then take preemptive action, such as seeking to have the registration of the malicious variant revoked or blocking the malicious variant from being accessible on a network (e.g., an enterprise private network) to prevent users from falling victim to a security attack by being directed to a malicious website. In various aspects, the data source 202 can be controlled and updated by the operator of the computer system 200 or a third party. Further, the computer system 200 can be communicatively coupled to a client 204 such that the computer system 200 can provide alerts thereto and/or receive commands therefrom to adjust the operational parameters of the computer system 200. The computer system 200 can be coupled to the client 204 via, e.g., the Internet or another telecommunication network.

Figure 3A:
FIG. 3A illustrates an image of a text string, in accordance with at least one aspect of the present disclosure.

Returning to FIG. 1A, the process 100 can be executed by, for example, the processor(s) 210 of the computer system 200 by executing the software of the optical domain name analysis module 214 stored in the memory 212. Accordingly, the processor 210, at step 102, receives one or more text strings from the data source 202. The text strings can include newly registered domain names, as discussed above. The received text string can include a set of, for example, diacritical characters, Unicode characters, and/or other ASCII or non-ASCII characters. For example, FIG. 3A depicts an image 302 rendering of the text string morgänstänlëy.com, which is representative of a potentially maliciously registered variant of the domain name morganstanley.com that could be utilized in a homograph attack. In this potentially malicious variant, the portion "rn" (i.e., the letters "r" and "n") appears confusingly similar to "m" in many fonts. Further, users could overlook the diacritics with the "a" (i.e., small Latin "a" with a diaeresis) and "ë" (i.e., small Latin "e" with a diaeresis) characters. Users can overlook these homoglyphs or otherwise similar appearing characters if they are not scrutinizing the domain name closely enough, if they are viewing the domain name on a small screen, or if background graphics or other obfuscation have been provided in conjunction with the link. Due to the high probability that this example domain name, rnorgänstänlëy.com, was registered with a malicious intent, it would thus be a candidate for an action to be brought with the domain name registrar to revoke its registration. In some aspects, the data source 202 provides domain names in Punycode, which is the representation of Unicode in the more limited ASCII character set. In these aspects, the processor 210 further converts the Punycode representation of the received domain name to the form in which the domain name would be rendered in a web browser (i.e., with the Unicode character set).

Figure 3B:
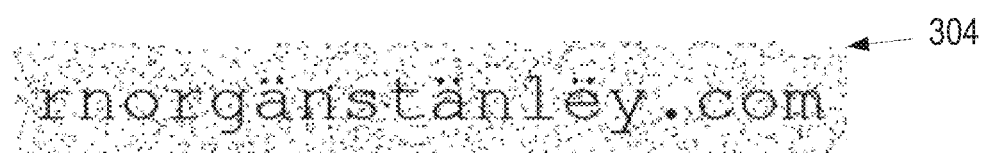
FIG. 3B illustrates a noisy image of a text string, in accordance with at least one aspect of the present disclosure.
Figure 3C:
FIG. 3C illustrates a blurry image of a text string, in accordance with at least one aspect of the present disclosure.
Figure 3D:
FIG. 3D illustrates a noisy and blurry image of a text string, in accordance with at least one aspect of the present disclosure.

Accordingly, the processor 210, at step 104, transforms each received text string to a set of images with at least one modification applied to each image version of the text string. In one aspect, the modification can include a particular font in which each text string image is rendered. In one aspect, the modification can include distortion applied to the text string image, such as blur applied to the rendering of the text string and/or noise that is applied to the image as a whole. For example, FIG. 3B depicts an image 304 rendering where noise has been applied to the image 302 depicted in FIG. 3A; FIG. 3C depicts an image 306 rendering where blur has been applied to the image 302 depicted in FIG. 3A; and FIG. 3D depicts an image 308 rendering where both noise and blur have been applied to the image 302 depicted in FIG. 3A. In various aspects, the blur, noise, and/or other distortions can be applied to the images via image processing libraries, such as Python Imaging Library.

FIG. 1B illustrates a process for executing step 104, i.e., an algorithm for transforming a text string to images with different fonts and/or distortions. Accordingly, the processor 210, at step 112, determines whether a domain name (received at step 102) is in an IDNA format, i.e., is an internationalized domain name. An internationalized domain name could be received in different formats. For example, an internationalized domain name can be rendered in Punycode, which is a representation of the internationalized domain name in the more limited ASCII character set via an encoding protocol ("ToASCII"). For example, the aforementioned internationalized domain name rnorgänstänlëy.com is rendered in Punycode as xn—rnorgnstnly-p8ad4h.com. It is common for certificate transparency networks to publish internationalized domain names in Punycode. The processor 210, at step 112, can thus determine whether the received domain name is an internationalized domain name according to whether the received domain name is in Punycode or another associated IDNA format.

If the received domain name is an internationalized domain name, then the processor, at step 114, converts internationalized domain name to the format in which it would be rendered within the web browser, chat, or email client (i.e., with Unicode characters), e.g., UTF-8, and then proceeds to step 116. If the received domain name is not an internationalized domain name, then the processor proceeds to step 116. In an alternative aspect where the domain name is an internationalized domain name, but is already received, at step 102, in the format in which it would be rendered within the web browser, then the processor can also proceed directly to step 116. Accordingly, the processor 210, at step 116, transforms the domain name to a set of images of the domain name rendered in different fonts. For example, the domain name can be transformed into images of the domain name rendered in 165 different fonts, such as Courier New, Free Serif, Times New Roman, Purisa Oblique, and so on.

Accordingly, the processor 210 next proceeds to at least one of steps 106, 118, 120, or 122. In various aspects, steps 118, 120, and/or 122 can each be performed automatically and/or simultaneously, be performed randomly, or be user-driven. For example, in some aspects, the processor 210 proceeds to each of the aforementioned steps 106, 118, 120, or 122. In other aspects, the processor 210 randomly proceeds to one or more of the aforementioned steps. In yet other aspects, the processor 210 proceeds to one or more of the aforementioned steps according to preprogrammed instructions and/or instructions by a user (delivered by, e.g., a prompt or other graphical user interface aspect on the client 204). If the processor 210 proceeds directly to step 106, then the process produces a "clean" or non-distorted image representation of the received domain name, as depicted in FIG. 3A. If the processor 210 proceeds to step 118, random noise is added to the image, as depicted in FIG. 3B. If the processor 210 proceeds to step 120, the image is blurred, as depicted in FIG. 3C. If the processor 210 proceeds to step 122, both random noise is added to the image and the image is blurred, as depicted in FIG. 3D. After one of steps 118, 120, 122 is performed, the processor 210 proceeds to step 106. Continuing the above example where the domain name is converted into 165 images with different fonts, the processor 210 can, in this example, then produce four different versions of each image (clean, noisy, blurry, and noisy and blurry), resulting in a set of 660 different images for each received domain name.

In one aspect, the steps 118, 120, 122 can each produce a single image. The degree of noise and/or blur added by the respective step 118, 120, 122 can be set according to preprogrammed instructions and/or instructions by a user. In another aspect, the steps 118, 120, 122 can produce more than one image. In other words, the steps 118, 120, 122 can produce multiple images having varying degrees of blur and/or noise added. Likewise, the varying degrees of blue and/or noise can be set according to preprogrammed instructions and/or instructions by a user.

Accordingly, the processor 210, at step 106, converts the domain name images back to text via optical character recognition (e.g., Tesseract OCR). In one aspect, the set of domain name images generated in various fonts and/or with various modifications applied is converted back to a text string via optical character recognition in order to ascertain whether any potential permutations or poor viewing conditions could cause the received text string (i.e., the newly registered domain name) to be confused with another text string (i.e., a monitored domain name). Due to the differences in fonts and/or modifications applied to the generated images of the received domain name, the optical character recognition process can produce different text strings than the originally received domain name. If the optical character recognition software can be caused to misidentify one or more characters in the text string, either due to nuances in the ways in which characters are rendered in different fonts or distortion, then it is likely that a user could likewise be confused and caused to misidentify the received text string. In other words, by operating in the optical domain, the process 100 more closely mimics how a human victim is ensnared by a hacker or phisher with a malicious link containing a malicious domain name. Other processes that utilize pure text algorithms do not take into account the variances in fonts, background images, or other obfuscations that might make a malicious variant of a domain name appear to be benign. The benefit in operating in the optical domain is that the process 100 simply analyzes whether two text strings look overly similar to each other, as opposed to other techniques that attempt to deduce rules to cover all possible ways in which two text strings could potentially look similar to each other. The presently described process 100 is thus both broader and more flexible.

Accordingly, the processor 210, at step 108, scores the converted text strings according to their degree of similarity to each text string entry in a watch list. The watch list can be, for example, stored in a library on a memory of the computer system 200 or an external memory accessible by the computer system 200. In one aspect, the watch list includes a list of domain names that an operator of the computer system 200 owns or otherwise wishes to monitor, so that the computer system 200 can provide alerts or take other actions when it determines that a potentially malicious variant has been newly registered. At step 108, the process 100 can include a variety of scoring algorithms for determining how related the converted text strings for the newly registered domains are to the text string entries in the watch list.

Figure 1C:
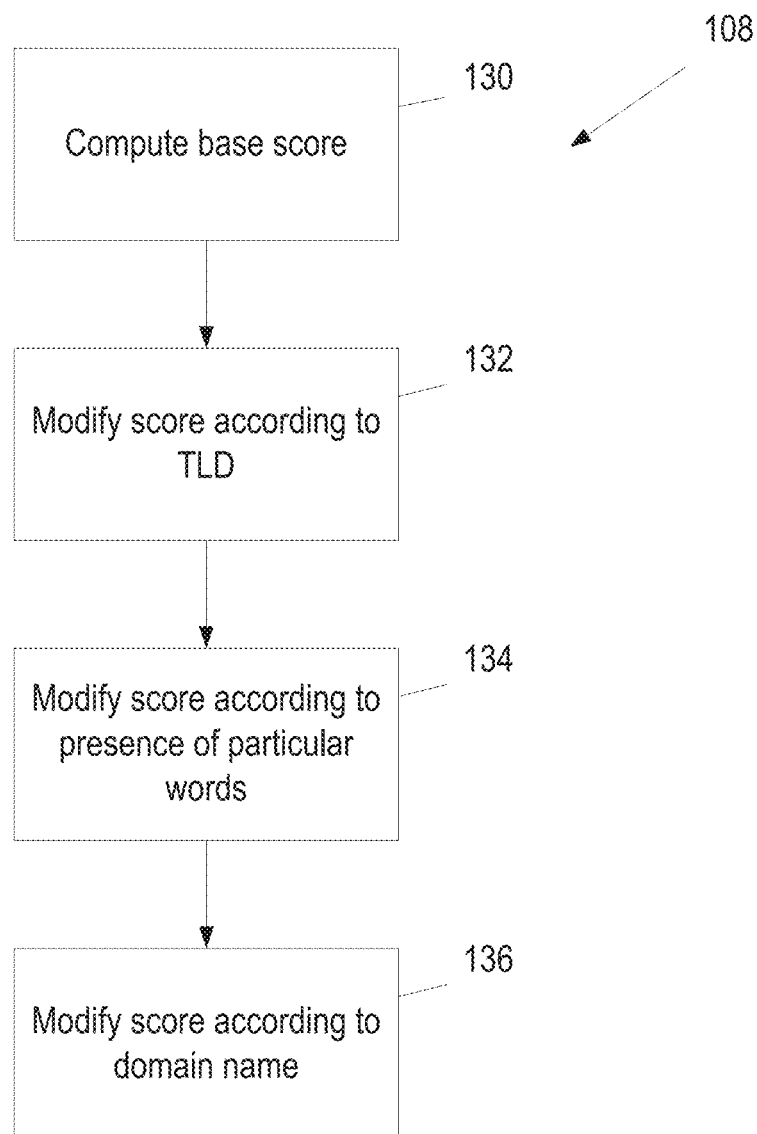
FIG. 1C illustrates a logic flow diagram of a process for scoring a converted text string, in accordance with at least one aspect of the present disclosure.

In one aspect, the scoring algorithm includes calculating the Levenshtein distance between the converted text strings and each entry in the watch list. In various aspects, the scoring algorithm can include additional terms or modifications to the base scoring algorithm (e.g., the Levenshtein distance calculation) based on, for example, threat intelligence regarding which tactics are currently favored by malicious actors. As one such example, FIG. 1C illustrates a logic flow diagram of a process for executing step 108, i.e., an algorithm for scoring a converted text string. Accordingly, the processor 210, at step 130, computes a base score (e.g., the Levenshtein distance) for the converted domain names relative to the watch list domain names.

In one aspect, the scoring algorithm can incorporate a modifier based upon the particular top-level domain (TLD) in the analyzed domain name. Certain TLDs (e.g., .ws, .cc, .xyz) are favored by malicious actors due to their low registration cost. Therefore, the presence of these low-cost TLDs can indicate that the received domain name is statistically more likely to be a malicious variant of a targeted domain name. Accordingly, the processor 210, at step 132, can modify the score of any analyzed domain names that have a TLD from a list of flagged TLDs.

In another aspect, the scoring algorithm can incorporate a modifier based on the presence of certain words (or versions thereof, including homoglyphs). A common technique used by malicious actors is to register a domain name that includes words commonly used as subdomains (e.g., "secure," "login," or "jobs") appended to words that match an otherwise legitimate domain. For example, a malicious actor could register login-yahoo.com (or versions thereof, including homoglyphs) to attempt to trick individuals that do not recognize the difference between login.yahoo.com (which is a legitimate subdomain of yahoo.com) and login-yahoo.com (which is a different domain than yahoo.com) into thinking that they were visiting the legitimate domain. Another common technique used by malicious actors is to register a domain name with a series of subdomains that collectively provide the appearance of a legitimate domain. For example, a malicious actor could register morganstanley.com.phishingsite.xyz (which is the domain phishingsite.xyz with a subdomain labeled com and a sub-subdomain labeled morganstanley) to attempt to trick individuals that do not recognize that this domain is not part of morganstanley.com. Therefore, the presence of text matching TLDs (e.g., com matches the TLD .com) or words matching certain monitored domains within subdomains of an analyzed domain could indicate that the domain name was registered with malicious intent. Accordingly, the processor 210, at step 134, can modify the score of any analyzed domain names that include particular words (e.g., "secure," "login," or text matching TLDs not located at the lop-level portion of the domain name).

In another aspect, the scoring algorithm can incorporate a modifier based on particular domain names. Certain domains (e.g., netflix.com, yahoo.com, gmail.com, and blockchain.com) are targeted at an especially high frequency due to a variety of factors, such as the frequency with which they are accessed by users and/or the type of users that visit them. Alternatively, an operator of the computer system 200 may simply wish to be especially vigilant about monitoring their own domain(s). Accordingly, the processor 210, at step 136, can modify the score of any analyzed domain names that mimic or are similar to any one of a particular set of domain names.

Accordingly, the processor 210, at step 110, compares the calculated score of the analyzed domain name(s) to a threshold. In aspects where the scoring algorithm includes or is otherwise based upon the Levenshtein distance, a low score could indicate that the analyzed domain name is similar to an enumerated domain name from a watch list and thus may have been registered for malicious purposes. In other aspects, the scoring algorithm can be programmed in a variety of other manners such that a high score could indicate that the analyzed domain name is similar to an enumerated domain name from a watch list and thus may have been registered for malicious purposes. If the comparison between the calculated score of the analyzed domain name and the threshold indicates that the analyzed domain could have been registered for malicious purposes, the computer system 200 can take a variety of actions in response. In one aspect, the computer system 200 can be programmed to cause a client 204 to display an alert (e.g., an email, a pop-up notification, and/or a push notification) or save the flagged domain name to a log file to notify a user that a potentially malicious domain name has been registered. In another aspect, the computer system 200 can be programmed to add the flagged domain name to a block list for a network (e.g., an enterprise private network) to prevent the flagged domain name from being accessed by computers on the network.

Various aspects of the subject matter described herein are set out in the following aspects, implementations, and/or examples:

In one general aspect, therefore, the present invention is directed to a computer-implemented method for analyzing a text string for similarity to one or more entries in a watch list. The method includes (i) transforming, by a computer system, the text string to an image of the text string, the image displaying the text string in a font and comprising a distortion; (ii) transforming, by the computer system, the image to a converted text string via optical character recognition; (iii) scoring, by the computer system, the converted text string according to similarity to each of the one or more entries in the watch list; and (iv) comparing, by the computer system, each score of the converted text string to a threshold.

In one aspect, the text string comprises a domain name.

In one aspect, the watch list comprises a set of domain names.

In one aspect, scoring the converted text string according to similarity to each of one or more entries of the watch list includes computing, by the computer system, a Levenshtein distance between the converted text string and each of the one or more entries of the watch list.

In one aspect, the computer-implemented method further includes modifying, by the computer system, each score of the converted text string according to a top-level domain thereof.

In one aspect, the watch list comprises a set of common words in malicious domain names.

In one aspect, the computer-implemented method further includes receiving, by the computer system, the text string from a certificate transparency log feed.

In one aspect, the distortion includes at least one of blur, noise, or combinations thereof.

In one aspect, the computer-implemented method further includes saving, by the computer system, the text string to a log according to whether at least one score of the converted text string exceeded the threshold.

In one aspect, the computer-implemented method further includes adding, by the computer system, the text string to a block list for a network according to whether at least one score of the converted text string exceeded the threshold.

In one aspect, the computer system for executing the various methods and/or steps recited above can include a set of one or more processor cores and a memory coupled to the set of one or more processor cores. The memory can stores instructions that, when executed by the set of one or more processor cores, causes the set of one or more processor cores to perform the various methods and/or steps recited above.

Each of the aforementioned aspects, implementations, and/or examples can be combined together in any form or combination not explicitly excluded by the present disclosure.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

The software for the various computer systems described herein (e.g., the computer system 200) and other computer functions described herein may be implemented in computer software using any suitable computer programming language (e.g., .NET, C, C++, Python) and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network, such as the network shown in FIG. 2, may include a packet-switched network. The communication devices may be capable of communicating with each other using a selected packet-switched network communications protocol. One example communications protocol may include an Ethernet communications protocol, which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard," published in December 2008, and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by the Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

In summary, numerous benefits have been described that result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A computer-implemented method for analyzing an original text string for similarity to one or more entries in a watch list, the method comprising:
   transforming, by a computer system, the original text string to an image of the original text string, the image displaying the original text string in a font and comprising a distortion, wherein the distortion comprises at least one of a blur or noise, wherein the distortion distorts text in the image such that when the image is subsequently transformed back to a converted text string via optical character recognition, the converted text string is different from the original text string;
   transforming, by the computer system, the image to the converted text string via optical character recognition;
   scoring, by the computer system, the converted text string according to similarity to each of the one or more entries in the watch list; and
   comparing, by the computer system, each score of the converted text string to a threshold.

2. The computer-implemented method of claim 1, wherein the original text string comprises a domain name.

3. The computer-implemented method of claim 1, wherein the watch list comprises a set of domain names.

4. The computer-implemented method of claim 1, wherein scoring the converted text string according to similarity to each of one or more entries of the watch list comprises computing, by the computer system, a Levenshtein distance between the converted text string and each of the one or more entries of the watch list.

5. The computer-implemented method of claim 1, further comprising modifying, by the computer system, each score of the converted text string according to a top-level domain thereof.

6. The computer-implemented method of claim 1, wherein the watch list comprises a set of common words in malicious domain names.

7. The computer-implemented method of claim 1, further comprising receiving, by the computer system, the original text string from a certificate transparency log feed.

8. The computer-implemented method of claim 1, further comprising saving, by the computer system, the original text string to a log according to whether at least one score of the converted text string exceeded the threshold.

9. The computer-implemented method of claim 1, further comprising adding, by the computer system, the original text string to a block list for a network according to whether at least one score of the converted text string exceeded the threshold.

10. A computer system for analyzing an original text string for similarity to one or more entries in a watch list, the computer system comprising:
    a set of one or more processor cores;
    a memory coupled to the set of one or more processor cores, the memory storing instructions that, when executed by the set of one or more processor cores, causes the set of one or more processor cores to:
    transform the original text string to an image of the original text string, the image displaying the text string in a font and comprising a distortion, wherein the distortion comprises at least one of a blur or noise, and wherein the distortion is for distorting text in the image such that when the image is subsequently transformed back to a converted text string via optical character recognition, the converted text string is different from the original text string;
    transform the image to the converted text string via optical character recognition;
    score the converted text string according to similarity to each of the one or more entries in the watch list; and
    compare each score of the converted text string to a threshold.

11. The computer system of claim 10, wherein the original text string comprises a domain name.

12. The computer system of claim 10, wherein the watch list comprises a set of domain names.

13. The computer system of claim 10, wherein the memory stores instructions that, when executed by the set of one or more processor cores, cause the set of one or more processor cores to score the converted text string according to similarity to each of one or more entries of the watch list by computing a Levenshtein distance between the converted text string and each of the one or more entries of the watch list.

14. The computer system of claim 10, wherein the memory stores instructions that, when executed by the set of one or more processor cores, cause the set of one or more processor cores to modify each score of the converted text string according to a top-level domain thereof.

15. The computer system of claim 10, wherein the watch list comprises a set of common words in malicious domain names.

16. The computer system of claim 10, wherein the memory stores instructions that, when executed by the set of one or more processor cores, cause the set of one or more processor cores to receive the original text string from a certificate transparency log feed.

17. The computer system of claim 10, wherein the memory stores instructions that, when executed by the set of one or more processor cores, cause the set of one or more processor cores to save the original text string to a log according to whether at least one score of the converted text string exceeded the threshold.

18. The computer system of claim 10, wherein the memory stores instructions that, when executed by the set of one or more processor cores, cause the set of one or more processor cores to add the original text string to a block list for a network according to whether at least one score of the converted text string exceeded the threshold.

* * * * *